US008449761B2

(12) United States Patent
Miller

(10) Patent No.: US 8,449,761 B2
(45) Date of Patent: May 28, 2013

(54) SYNTHESIS OF A CRYSTALLINE SILICOALUMINOPHOSPHATE

(71) Applicant: Stephen Joseph Miller, San Francisco, CA (US)

(72) Inventor: Stephen Joseph Miller, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 13/711,759

(22) Filed: Dec. 12, 2012

(65) Prior Publication Data

US 2013/0105360 A1    May 2, 2013

Related U.S. Application Data

(63) Continuation of application No. 13/616,371, filed on Sep. 14, 2012, now Pat. No. 8,372,368, and a continuation of application No. 13/252,766, filed on Oct. 4, 2011, now abandoned, and a continuation of application No. 12/181,652, filed on Jul. 29, 2008, now abandoned.

(51) Int. Cl.
*B01J 29/85*    (2006.01)

(52) U.S. Cl.
USPC ........... 208/106; 502/163; 502/208; 502/214; 502/415; 423/328.1

(58) Field of Classification Search
USPC ...................... 428/328.1; 208/262.1; 502/163, 502/208, 214, 415
See application file for complete search history.

(56) References Cited

U.S. PATENT DOCUMENTS 6,306,790 B1 * 10/2001 Rodriguez et al. .............. 502/64

* cited by examiner

*Primary Examiner* — Brian McCaig
(74) *Attorney, Agent, or Firm* — Michael D. Ross; Edward T. Mickelson

(57) ABSTRACT

The present invention is a method for synthesizing non-zeolitic molecular sieves which have a three dimensional microporous framework comprising [$AlO_2$] and [$PO_2$] units. In preparing the reaction mixture, a surfactant is used, coupled with non-aqueous impregnation to prevent acid sites from being destroyed by water during Pt impregnation. The superior SAPO exhibits higher activity and selectivity especially in catalytic hydroisomerization of waxy feeds, due to the presence of medium-sized silica islands distributed throughout the SAPO.

19 Claims, 9 Drawing Sheets

Figure 7

Si, Al, and P Distribution in SAPO's

SYNTHESIS OF A CRYSTALLINE SILICOALUMINOPHOSPHATE

CROSS-REFERENCE TO RELATED APPLICATIONS

This application is a continuation of U.S. patent application Ser. No. 13/616,371 application filed Sep. 14, 2012, now U.S. Pat. No. 8,372,368, which is a continuation of U.S. patent application Ser. No. 13/252,766, filed Oct. 4, 2011, abandoned Sep. 17, 2012, which is a continuation of U.S. patent application Ser. No. 12/181,652, filed Jul. 29, 2008, abandoned Oct. 5, 2011, the contents of each of which are incorporated herein by reference in their entirety.

FIELD OF THE INVENTION

This invention relates to a new crystalline silicoaluminophosphate (SAPO) molecular sieve and to its synthesis.

BACKGROUND OF THE INVENTION

Silicoaluminophosphates (SAPO) are taught in U.S. Pat. No. 4,440,871, for example. SAPO materials are both microporous and crystalline and have a three-dimensional crystal framework of $PO_2^+$, $AlO_2^-$ and $SiO_2$ tetrahedral units and, exclusive of any alkali metals or other cation which may optionally be present, an as-synthesized empirical chemical composition on an anhydrous basis of:

$$mR:(Si_xAl_yR_z)O_2$$

wherein "R" represents at least one organic templating agent present in the intracrystalline pore system; "m" represents the moles of "R" present per mole of $(Si_xAl_yR_z)O_2O_2$ and has a value of from 0 to 0.3, the maximum value in each case depending upon the molecular dimensions of the templating agent and the available void volume of the pore system of the particular SAPO species involved; "x", "y", and "z" represent the mole fractions of silicon, aluminum, and phosphorus, respectively, present as tetrahedral oxides. The minimum value for each "x", "y", and "z" is 0.01 and preferably 0.02. The maximum value for "x" is 0.98; for "y" is 0.60; and for "z" is 0.52.

Typically, the silicoaluminophosphate molecular sieves are synthesized by hydrothermally crystallizing a hydrous gel made from substantially homogeneous aqueous reaction mixture containing reactive sources of aluminum, phosphorus, silicon and the other element(s), if any, required in the molecular sieve. The reaction mixture also preferably contains an organic templating, i.e., structure-directing, agent, preferably a compound of an element of Group VA of the Periodic Table, and/or optionally an alkali or other metal. The reaction mixture is generally placed in a sealed pressure vessel, preferably with an inactive metallic surface or alternatively, lined with an inert plastic material such as polytetrafluoroethylene and heated, preferably under autogenous pressure, at a temperature between 50° C. and 250° C., and preferably between 100° C. and 200° C., until crystals of the non-zeolitic molecular sieve product are obtained. Usually this is for a period of from several hours to several weeks. Effective crystallization times from about 2 hours to about 30 days are generally employed. The molecular sieve is recovered by any convenient method, for example, centrifugation or filtration.

It is disclosed in U.S. Pat. No. 4,440,871 that while not essential to the synthesis of SAPO compositions, it has generally been found that stirring or other moderate agitation of the reaction mixture and/or seeding the reaction mixture with seed crystals of either the SAPO species to be produced or a topologically similar aluminophosphate or aluminosilicate composition, facilitates the crystallization procedure. These silicoaluminophosphates exhibit several physical and chemical properties which are characteristic of aluminosilicate zeolites and aluminophosphates.

U.S. Pat. No. 4,943,424 describes a SAPO molecular sieve designated SM-3. It is characterized to distinguish it from all other silicoaluminophosphate forms as being a silicoaluminophosphate having a phosphorus, silicon, and aluminum concentration at the molecular sieve surface that is different than the phosphorus, silicon, and aluminum concentration in the bulk of the molecular sieve, and having the essential X-ray diffraction pattern of SAPO-11.

None of the U.S. patents mentioned above discloses or teaches how to make the crystalline silicoaluminophosphate molecular sieve of this invention.

SUMMARY OF THE INVENTION

This invention is a molecular sieve composition having the topology AEL and being isostructural with conventional SAPO-11. The composition has a framework of tetrahedrally-arranged silicon, aluminum, and phosphorus. It is designated SM-7, wherein the composition has a ratio of Si atoms coordinated as Si(3Al1Si) to that coordinated as Si(4Si) of at least 0.5, presence of Si atoms coordinated as Si(4Al) less than 30 mol. % and a mean mesopore diameter of less than 200 angstroms (Å), and more preferably a ratio of Si atoms coordinated as Si(3Al1Si) to that coordinated as Si(4Si) of at least 0.8, presence of Si atoms coordinated as Si(4Al) less than 25 mol. % and a mean mesopore diameter of less than 195 angstroms, and most preferably a ratio of Si atoms coordinated as Si (3 Al1Si) to that coordinated as Si(4Si) of at least 1, presence of Si atoms coordinated as Si(4Al) less than 23 mol. % and a mean mesopore diameter of less than 190 angstroms (See Table 5). Generally, the molecular sieve compositions of the present invention are intermediate pore molecular sieves (vide infra).

The manufacturing process: A method of manufacturing non-zeolitic molecular sieve catalyst using a crystalline silicoaluminophosphate molecular sieve having a three dimensional microporous framework structure of $[AlO_2]$ and $[PO_2]$ units wherein the ratio of Si atoms coordinated as Si(3Al1Si) to that coordinated as Si(4Si) of at least 0.5, presence of Si atoms coordinated as Si(4Al) less than 30 mol. % and has a mean mesopore diameter of less than 200 angstroms:

(a) preparing an aqueous reaction mixture containing a reactive source of silicon, a reactive source of aluminum, a reactive source of phosphorus, a surfactant, and an organic templating agent, said reaction mixture having a composition expressed in terms of mole ratios of oxides of:

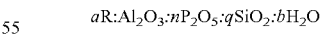

$$aR:Al_2O_3:nP_2O_5:qSiO_2:bH_2O$$

wherein R is an organic templating agent; "a" has a value large enough to constitute an effective amount of R; "b" has a value such that there are 10 to 40 moles of $H_2O$ per mole of aluminum oxide ($Al_2O_3$); said reaction mixture having been formed by controlling the molar ratio of the templating agent to phosphorus (as $P_2O_5$) in the reaction mixture to be greater than about 0.05 before the molar ratio of aluminum (as $Al_2O_3$) to phosphorus (as $P_2O_5$) in the reaction mixture becomes greater than about 0.5; heating the reaction mixture at a temperature and a time sufficient until crystals of silicoaluminophosphate are formed; combining the crystals of silicoaluminophosphate with an active source of a hydrogenation component dissolved in a non-aqueous solvent and removing substantially all of the non-aqueous solvent at a temperature and for a time sufficient to produce non-zeolitic silicoaluminophosphate molecular sieve catalytic particulates; and (b) recovering the non-zeolitic silicoaluminophosphate molecular sieve particles.

In step (a), the surfactant is preferably dissolved in alcohol in the substantial absence of the silicon source. Following step (c), the particles may be bound in an extrudate to create a catalyst, prior to metals addition.

BRIEF DESCRIPTION OF THE FIGURES OF THE DRAWINGS

FIG. 7 is a representation of the Si, Al, and P distribution types in SAPO's.

DETAILED DESCRIPTION OF THE EMBODIMENTS

Figure 1:
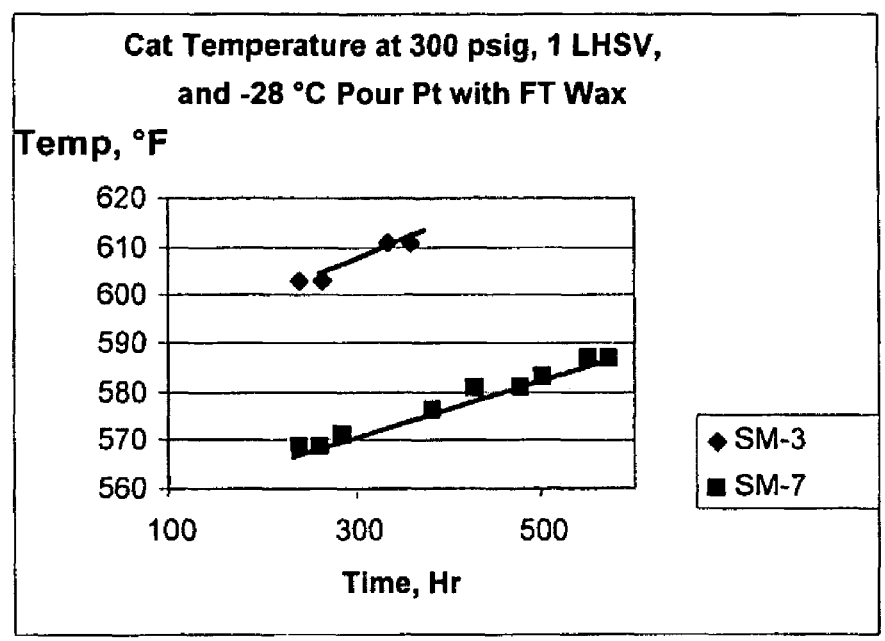
FIG. 1 shows the relative activity of SM-7 and SM-3 in lowering the pour point of a Fischer-Tropsch wax.

The molecular sieve catalyst of this invention is useful for the hydroconversion of hydrocarbons. The SM-7 sieve differs from prior intermediate pore silicoaluminophosphate (SAPO) molecular sieves in the following ways: it possesses a smaller mean mesopore diameter, the ratio of Si atoms coordinated as Si(3Al1Si) to that coordinated as Si(4Si) is at least 0.5, and the presence of Si atoms coordinated as Si(4Al) is less than 30 mol. %. The catalyst utilizing the sieve of this invention exhibits unique and useful catalytic and shape-selective properties.

The hydroconversion activity of a catalyst is usually determined by comparing the temperature at which various catalysts must be utilized under otherwise constant reaction conditions with the same feedstock and the same conversion rate of products. The lower the reaction temperature for a given extent of reaction, the more active the catalyst is for the specified process. The silicoaluminophosphate of the present invention, which is a SAPO-11 type silicoaluminophosphate, shows superior activity and selectivity as compared to other known SAPO-11 silicoaluminophosphates. The selectivity is a measure of the yield of a desired product.

The silicoaluminophosphate molecular sieve of this invention, as-synthesized, has a crystalline structure whose X-ray powder diffraction pattern is similar to that of SAPO-11 as disclosed in U.S. Pat. No. 4,440,871. The silicoaluminophosphate molecular sieve as synthesized is characterized as comprising a three-dimensional microporous crystal framework structure of [SiO$_2$], [AlO$_2$], and [PO$_2$] tetrahedral units which has a composition in terms of mole ratio of oxides on an anhydrous basis expressed by the formula:

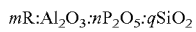

$m$R:Al$_2$O$_3$:$n$P$_2$O$_5$:$q$SiO$_2$ wherein "R" represents at least one organic templating agent referred to as "template" herein present in the intracrystalline pore system; "m" represents the moles of "R" present and has a value such that there are from 0.02 to 2 moles of R per mole of alumina; "n" has a value of from 0.85 to 1.1 and preferably 0.90 to 1, and "q" has a value of from 0.1 to 4 and preferably 0.1 to 1. Generally, the silicoaluminophosphate molecular sieve of this invention is an intermediate pore (size) molecular sieve (vide infra).

Alumina is defined in this application as Al$_2$O$_3$.

The SM-7 silicoaluminophosphate molecular sieve as synthesized may also be expressed in terms of its unit empirical formula. On an anhydrous basis it is expressed by the formula:

$m$R(Si$_x$Al$_y$P$_z$)O$_2$ wherein R and m are defined hereinabove; "x", "y", and "z" represent the mole fraction of silicon, aluminum, and phosphorus, respectively, present as tetrahedral oxide units.

The SM-7 silicoaluminophosphate is further characterized in that the P$_2$O$_5$ to alumina mole ratio at the surface of the silicoaluminophosphate is about 0.80 or less and preferably in the range of 0.80 to 0.55, the P$_2$O$_5$ to alumina mole ratio in the bulk of the silicoaluminophosphate is 0.85 or greater, preferably in the range of 0.90 to 1.1, and most preferably in the range of 0.90 to 1, and the SiO$_2$ to alumina mole ratio at the surface of the silicoaluminophosphate is greater than the SiO$_2$ to alumina mole ratio within the bulk of the silicoaluminophosphate.

The silicon content of the sieve is greater at the surface of the silicoaluminophosphate than in the bulk of the sieve. The term "silicon content" at the surface of the sieve refers to the amount of silicon at the surface of the sample as can be measured using X-ray photoelectron spectroscopy (XPS) surface analysis; this silicon content will include any amorphous silica that is present. The sieves of this invention have higher silicon contents at the surface than in the bulk. In this comparison, either silica contents per se or the silica/alumina ratios can be compared.

While often difficult to quantify, the term "porosity," as used herein, is generally consistent with its IUPAC definition. See Rouquerol et al., Pure & Appl. Chem., vol. 66, pp. 1739-1758, 1994. To describe a composition's porosity in terms of pore size, the following terms can be used: "micropore" for pore diameters less than 2 nm, "mesopore" for pore diameters in the range of 2-50 nm, and "macropore" for pore diameters greater than 50 nm. Note that a given material or composition may have pores in two or more such size regimes, e.g., a particle may comprise macroporosity and microporosity.

By "intermediate pore size," as used herein and with reference to molecular sieves (i.e., intermediate pore molecular sieves), is meant an effective pore aperture in the range of about 5 to 6.5 angstroms (Å) when the molecular sieve is in the H-form. Molecular sieves having pore apertures in this range tend to have unique molecular sieving characteristics.

Unlike small pore zeolites such as erionite and chabazite, they will allow hydrocarbons having some branching into the molecular sieve void spaces. Unlike larger pore zeolites such as the faujasites and mordenites, they can differentiate between n-alkanes and slightly branched alkanes on the one hand and larger branched alkanes having, for example, quaternary carbon atoms.

The effective pore size of the molecular sieves can be measured using standard adsorption techniques (e.g., BET) and hydrocarbonaceous compounds of known minimum kinetic diameters. See Breck, Zeolite Molecular Sieves, 1974 (especially Chapter 8); Anderson et al., J. Catalysis 58, 114 (1979); and Leofanti et al., Catalysis Today 41, 207 (1998); all of which are incorporated by reference.

Intermediate pore size molecular sieves in the H-form will typically admit molecules having "kinetic diameters" of 5.0 to 6.5 angstroms with little hindrance. Examples of such compounds (and their kinetic diameters in angstroms) are: n-hexane (4.3), 3-methylpentane (5.5), benzene (5.85), and toluene (5.8). Compounds having kinetic diameters of about 6 to 6.5 angstroms can be admitted into the pores, depending on the particular sieve, but do not penetrate as quickly and in some cases are effectively excluded. Compounds having kinetic diameters in the range of 6 to 6.5 angstroms include: cyclohexane (6.0), 2,3-dimethylbutane (6.1), 2,2-dimethylbutane (6.2), m-xylene (6.1) and 1,2,3,4-tetramethylbenzene (6.4). Generally, compounds having kinetic diameters of greater than about 6.5% do not penetrate the pore apertures and thus are not absorbed into the interior of the molecular sieve lattice. Examples of such larger compounds include: o-xylene (6.8), hexamethylbenzene (7.1), 1,3,5-trimethylbenzene (7.5), and tributylamine (8.1).

The term "unit empirical formula" is used herein according to its common meaning to designate the simplest formula which gives the relative number of atoms of silicon, aluminum, and phosphorus which form a $[PO_2]$, $[AlO_2]$, and $[SiO_2]$ tetrahedral unit within a silicoaluminophosphate molecular sieve and which forms the molecular framework of the SM-7 composition.

The proportions of the various components in the aqueous reaction mixture affect, inter alia, the rate at which the synthesis progresses, the yield, the crystal framework, the distribution of Si atoms as derived by $^{29}Si$ MAS NMR, and the porosity of the non-zeolitic molecular sieve.

In the preparation of the aqueous reaction mixture required to prepare the SM-7 molecular sieve, the amounts in which the specific ingredients are mixed together and the order in which they are mixed together are critical in forming the specific structure and its physical porosity. In accordance with the present invention, a reaction mixture containing a reactive source of $SiO_2$, a source of aluminum such as aluminum isopropoxide, phosphoric acid, and a surfactant, is prepared. Other sources of aluminum that may be used in the preparation of this non-zeolitic molecular sieve include aluminum alkoxides other than aluminum isopropoxide, or a pseudo-boehmite hydrated aluminum oxide. Aluminum isopropoxide is the preferred source of aluminum. U.S. Pat. No. 4,310,440, which discloses aluminum phosphate molecular sieves, and U.S. Pat. No. 4,440,871, which discloses silicoaluminophosphates and their preparation, list these sources of aluminum for the preparation of these molecular sieves. These disclosures are incorporated herein by reference.

The surfactant is preferably a $C_8+$ alkylamine which may be dissolved in an alcohol or mixture of alcohols. The alcohol is preferably selected from a $C_1$ to $C_8$ alcohol or a mixture of such alcohols. The surfactant may be added without a solvent.

The order of addition of reagents to the reaction mixture is adjusted to reduce or eliminate the coagulation of the aluminum source in the reaction mixture. Preferably, in preparing the aqueous reaction mixture, the phosphorus source is added prior to the addition of the aluminum source. Accordingly, the molar ratio of the templating agent to phosphorus (source) in the reaction mixture should be greater than about 0.05, preferably greater than about 0.1, and most preferably, greater than about 0.2 before the ratio of aluminum to phosphorus is greater than about 0.5. Preferably, the above, molar ratios of templating agent to phosphorus should be present in the reaction mixture before the molar ratio of aluminum to phosphorus in the reaction is greater than about 0.3, and most preferably greater than about 0.25.

The term "templating agent" although used in the singular includes the plural. Thus, if more than one template is used in the reaction mixture, then to determine the molar ratio of the templating agent present in the mixture, the molar ratios of each template should be added together. Additionally, the above molar ratio of template includes the amount of any compound that itself does not contribute to the formation of the desired molecular sieve but does reduce the viscosity of the reaction mixture. Such a compound would not interfere with the structure directing properties of the template. An example would include the addition of small amines to supplant the extensive use of the higher molecular weight quaternary ammonium compounds.

In preparing a targeted molecular sieve, one of ordinary skill would follow the teachings known in the art for synthesizing the desired sieve; such as, the amount and types of reagents, crystallization temperatures, etc., but, it is critical to the instant invention that the molar ratio of the templating agent to phosphorus (source) in the reaction mixture be greater than about 0.05 before the ratio of aluminum to phosphorus in the reaction mixture is greater than about 0.5. Subsequently, in crystallizing the targeted non-zeolitic molecular sieve, the reaction mixture should have the proper molar amounts and proper conditions should be maintained for producing the targeted intermediate pore molecular sieve.

The use and order of addition of the reactants in the reaction mixture are important in forming the active sieve of this invention. On a laboratory scale where reagents are readily mixed, the crystallization methods described in the prior art have been effective in producing molecular sieves in high yields. However, for larger scale preparations such as commercial catalyst manufacture, synthesis techniques require the constituents to be combined over a substantially longer period of time. When the aluminum source is added to the phosphorus source at an aluminum to phosphorous atomic ratio of greater than 0.5 without the addition of template, there is a voluminous coagulum of aluminum specie or species; resulting in a final mixture that is thick, viscous, and not readily dispersible. Therefore, there is a need for a method for producing molecular sieves in quantities sufficient for commercial applications, and that avoids the problematic aluminum coagulation.

As used herein the terms "coagulum" and "precipitate" are used interchangeably and refer to the separation and binding together of the reagent, in solid form, in the reaction mix.

Figure 3:
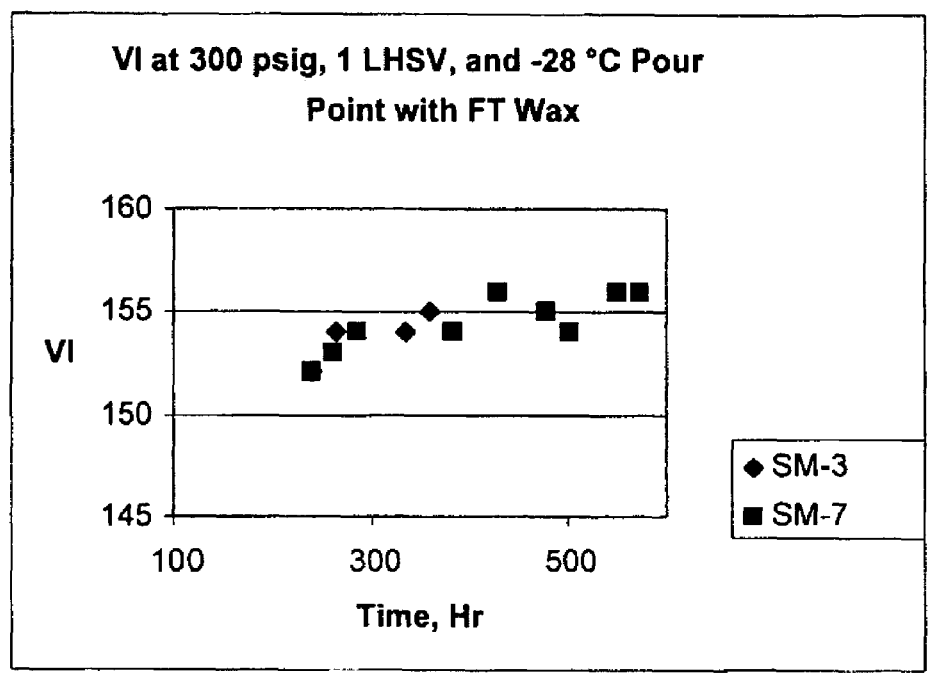
FIG. 3 compares VI of the 650° F.+ bottoms oil made by SM-7 from a Fischer-Tropsch wax feedstock with that of the 650° F.+ bottoms oil made with SM-3.
Figure 7:
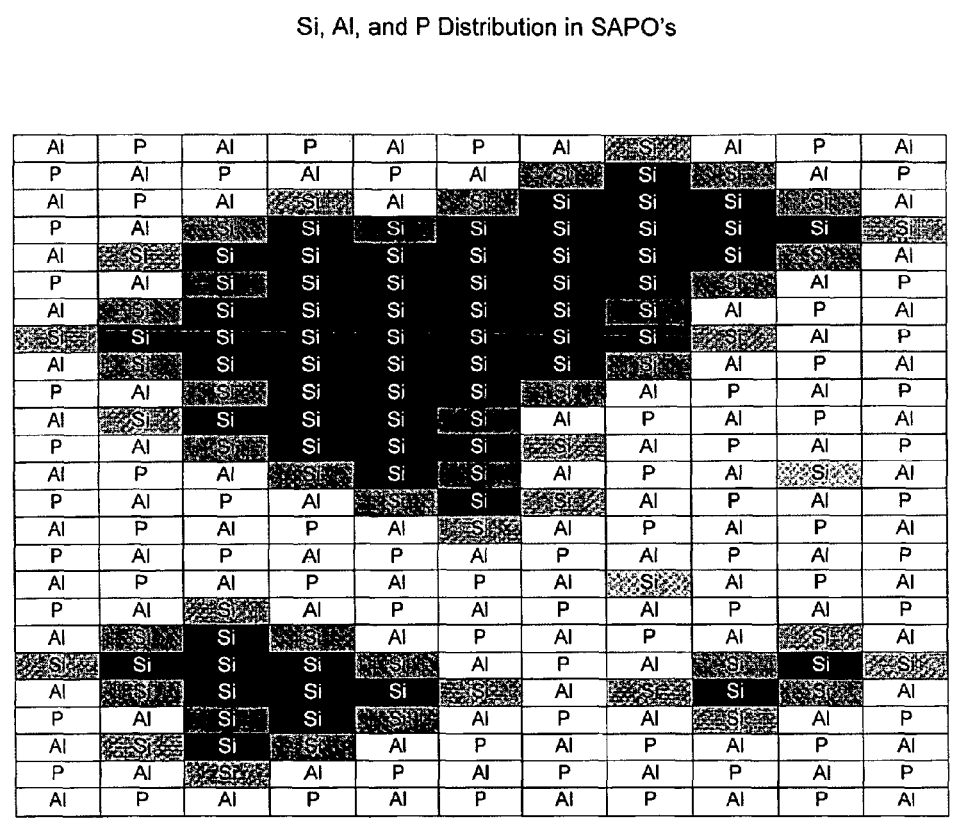

As shown in FIG. 7, aluminophosphates or $AlPO_4$ molecular sieves have a framework of $AlO_4$ and $PO_4$ tetrahedra linked by oxygen atoms (not shown). These materials are neutral and do not have any acidity. By replacing some of the $PO_4$ tetrahedra by $SiO_4$, acidity can be introduced to these materials, which are known as silicoaluminophosphates or SAPOs. The overall acidity of SAPOs depends not only upon the Al content in the sample, but also upon the distribution of the Al in the sample. As shown in FIG. 3, in various scenarios, Si may be surrounded by four Al atoms when the dispersion is very high or it may be surrounded by four Si atoms when the dispersion is low, forming large Si islands. As shown in FIG. 7, Si atoms also may be surrounded by one, two or three Al atoms. Such Si atoms that are surrounded by one, two or three Al atoms introduce acidity and are an important characteristic influencing catalytic activity in SAPO materials.

Since the initial work of Lippmaa et al. (J. Am. Chem. Soc., 102, 4889-93, 1980), there have been many studies of the zeolites by $^{29}$Si magic angle spinning (MAS) nuclear magnetic resonance (NMR). It was first demonstrated by Lippmaa that the $^{29}$Si MAS NMR of zeolites contains five reasonably well resolved peaks corresponding to the five possible distributions of Si and Al around a silicon atom of the $SiO_4$ tetrahedra. The characteristic chemical shift range of the five different local silicon environments is presented in Table 2.

TABLE 2

Characteristic $^{29}$Si MAS NMR Chemical Shift Range of Different Si Environment

| Si Environment | Si(4Al) | Si(3Al,1Si) | Si(2Al,2Si) | Si(1Al,3Si) | Si(4Si) |
|---|---|---|---|---|---|
| Chemical Shift Range (ppm, from Tetra-Methyl Silane) | −80 to −94 | −95 to −99 | −100 to −105 | −106 to −108 | −109 to −120− |

$^{29}$Si MAS NMR may be used to estimate the distribution of silicon in SAPOs. However, it must be noted that Si concentrations in SAPOs could be as low as 1 wt. % which makes it very difficult to obtain very high quality NMR data. Moreover, these signals are not well resolved as in the case of zeolites. Consequently, there is some degree of uncertainty introduced into deconvolution and in estimating the number of Si atoms in various environments. Nevertheless, the information about the approximate distribution of Si atoms is high enough to determine the extent of dispersion of silicon in the SAPO materials.

A comparison of $^{29}$Si MAS NMR for SM-3 and SM-7 samples is found in the Discussion of Results section below. The studies revealed that acidic activity is improved in SM-7, which possesses larger Si islands.

In synthesizing the composition of this invention known as SM-7, it is preferred that the reaction mixture be essentially free of alkali metal cations, and accordingly a preferred reaction mixture composition expressed in terms of mole ratio of oxides is as follows:

$$aR:Al_2O_3:nP_2O_5:qSiO_2:bH_2O$$

wherein "R" is an organic templating agent; "a" has a value great enough to constitute an effective concentration of "R" and preferably has a value such that there are from about 0.20 to 2 moles of R per mole of alumina and more preferably about 0.8 to 1.2; "b" has a value such that there is 10 to 60 moles of $H_2O$ per mole of aluminum oxide, preferably 20 to 50.

In the synthesis method of the present invention, an aqueous reaction mixture is formed by combining the reactive aluminum and phosphorus sources, with a portion of the templating agent, in the substantial absence of the silicon source. The resulting reaction mixture is then combined with the silicon source and thereafter the mixture is combined with the template. If alkali metal cations are present in the reaction mixture, they should be present in sufficiently low concentrations that they do not interfere with the formation of the SM-7 composition.

Any inorganic cations and anions which may be present in the reaction mixture are generally not provided by separately-added components. Rather, these cations and anions will frequently come from compounds added to the reaction mixture to provide the other essential components such as the silicon source or such as the organic templating agent.

More specifically, the synthesis method comprises:
(a) preparing an aqueous reaction mixture comprising the following reactants:
$SiO_2$ (silicon source), aluminum isopropoxide (source of aluminum), phosphoric acid (phosphorous source), a surfactant, preferably an alcohol, and an organic templating agent, said reaction mixture having a composition expressed in terms of mole ratios of oxides as:

$$aR:Al_2O_3:nP_2O_5:qSiO_2:bH_2O$$

wherein R is an organic templating agent; "a" has a value large enough to constitute an effective amount of R; "b" has a value such that there are 10 to 60 moles of $H_2O$ per mole of aluminum oxide ($Al_2O_3$); said reaction mixture having been formed by combining the reactive aluminum source, reactive phosphorus source, and the templating agent, wherein a portion of the templating agent is added prior to complete addition of the aluminum source and the surfactant (preferably dissolved in alcohol) in the substantial absence of the silicon-source, thereafter combining the resulting mixture with the silicon source to form the complete reaction mixture;
(b) heating the reaction mixture to a temperature in the range of from 100° C. to 200° C. until crystals of silicoaluminophosphate are formed; and
(c) recovering said crystals.

The crystallization is conducted under hydrothermal conditions under pressure and usually in an autoclave so that the reaction mixture is subject to autogenous pressure. Following crystallization of the SM-7 material, the reaction mixture containing same is filtered and the recovered crystals are washed, for example, with water, and then dried, such as by heating at from at least 25° C. to about 150° C. at atmospheric pressure. Preferably, the supernatant liquid above the crystals is removed prior to the initial filtering of the crystals.

The SM-7, prepared as depicted in the instant invention, is beneficially subjected to thermal treatment to remove the organic templating agent. This thermal treatment is generally performed by heating at a temperature of about 300° C. to about 700° C. for at least 1 minute and generally not longer than 20 hours. While sub-atmospheric pressure can be employed for the thermal treatment, atmospheric pressure is desired for reasons of convenience. The thermally treated product is particularly useful in the catalysis of certain hydrocarbon conversion reactions.

While not intending to be limited to theory, it appears $SiO_2$ does not enter the structure until late in the crystallization, such that under the conditions of the process of this invention, in the early phases of the reaction, there is produced a near aluminophosphate phase surrounded by a $SiO_2$-rich amorphous phase. As $PO_4^{-3}$ is depleted by reaction with $Al^{+3}$ species, the pH of the mixture rises from about 8-8.5 to about 10-10.5. This increases the dissolution of $SiO_2$ permitting silica incorporation into the structure such that there is a silica gradient through the crystal with more silica near the exterior than at the center. The $P_2O_5$ to alumina ($Al_2O_3$) mole ratio within the bulk of the SM-7 silicoaluminophosphate is 0.85 or greater, and preferably from 0.90 to 1.

The surface silica rich phase on the outside of the sieve contains a higher $SiO_2$ to alumina mole ratio than in the bulk. Material with higher surface silica to alumina mole ratios appears to show increased acidity and increased activity.

If necessary, the pH can be lowered into the proper region using acids such as HCl or $H_3PO_4$. The latter may be preferred, since having a slight excess of $PO_4^{-3}$ will help ensure that the $PO_4^{-3}$ concentration is never so low that the alumina and silica components have nothing to react with but each other.

An excess of water over the described range tends to lead to rapid incorporation of silica into the product. Excess water also leads to larger crystals which may diminish activity due to diffusion constraints. In the present invention, a crystallite size of less than 1 micron is produced with an average size less than 0.5 micron.

The organic template or directing agent is preferably selected from di-n-propylamine and di-isopropylamine or mixtures thereof.

The silica may be any silica source capable of being dissolved and/or dispersed in the liquid reaction mixture. Preferably, the silica is introduced into the reaction mixture as either a silica sol or as fumed silica. Useful sources of silicon oxide (silica) include any one or more forms of silicic acid or silicon dioxide, alkoxy- or other compounds of silicon. Preferably, a form of silicon oxide known as CABOSIL (Cabot Corp.) is used.

Typically, the crystalline silicoaluminophosphate molecular sieve of the instant invention has an AEL topology. Other topologies include, but are not limited to, ATO and AFO. See Atlas of Zeolite Structure Types, Fourth Edition, W. M. Meier, D. H. Olson, and Ch. Baerlocher, Elsevier, 1996.

The SM-7 synthesized as described herein can be used as catalyst in intimate combination with a metal component such as silver, tungsten, vanadium, molybdenum, rhenium, chromium, manganese, or a Group VIII metal, preferably platinum or palladium where, for example, a hydrogenation-dehydrogenation or oxidation function is to be performed. Such a component can be ion-exchanged into the composition, impregnated therein, or intimately physically admixed therewith. Such component can be impregnated into or onto the composition, such as, for example, in the case of platinum, by treating the crystal with a solution containing a platinum metal-containing ion. Thus, suitable platinum compounds include chloroplatinic acid, platinous chloride, and various compounds containing the platinum amine complex. The preferred impregnation of a Group VIII metal, preferably platinum, is performed in a non-aqueous solution. Impregnation of metals onto molecular sieves employing non-aqueous solution is disclosed in U.S. Pat. No. 5,939,349.

Further, the present SM-7, when employed either as an adsorbent, ion-exchanger, or as a catalyst in an organic compound conversion process should be dehydrated, at least partially. This can be done by heating to a temperature in the range of about 200° C. to about 600° C. in air or an inert atmosphere, such as nitrogen, etc., and at atmospheric, sub-atmospheric, or super-atmospheric pressures for about 30 minutes to about 48 hours. Dehydration can also be performed at room temperature merely by placing the crystalline material in a vacuum, but a longer time is required to obtain a sufficient amount of dehydration. Therefore, depending upon the degree of dehydration or thermal treatment desired for the SM-7, it may be subjected to heating at a temperature of from about 200° C. to about 700° C. for a time of from at least 1 minute to about 48 hours.

The crystals of SM-7 prepared by the instant invention can be used to prepare shaped particles in a variety of sizes. Generally speaking, the particles can be in the form of a powder, a granule, or a molded product, such as an extrudate having a particle size sufficient to pass through a 2-mesh (Tyler) screen and be retained on a 400-mesh (Tyler) screen. In cases where the composition is molded, such as by extrusion, the particles can be formed by extrusion before drying, or they can be partially dried and then extruded.

In the case of many catalysts, it is desired to incorporate the SM-7 with another material resistant to the temperatures and other conditions employed in organic conversion processes. Such materials include active and inactive material and synthetic or naturally occurring zeolites as well as inorganic materials such as clays, silica, alumina, and/or metal oxides. The latter may be either naturally occurring or in the form of gelatinous precipitates or gels including mixtures of silica and metal oxides. Use of a material in conjunction with the SM-7, i.e., combined therewith, which is active, tends to improve the conversion and/or selectivity of the catalyst in certain organic conversion processes. Inactive materials suitably serve as diluents to control the amount of conversion in a given process so that products can be obtained economically without employing other means for controlling the rate of reaction. These materials may be incorporated into naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having very high crush strength because in commercial use it is desirable to prevent the catalyst from breaking down into powder-like materials. These clay binders have been employed normally only for the purpose of improving the crush strength of the catalyst.

Naturally occurring clays which can be composited with the new crystal include the montmorillonite and kaolin families which include the subbentonites, and the kaolins commonly known as Dixie, McNamee, Ga., and Florida clays or others in which the main mineral constituent is halloysite, kaolinite, dickite, nacrite, or anauxite. Such clays can be used in the raw state as originally mined or initially subjected to calcination, acid treatment, or chemical modification. Binders useful for compositing with the present crystal also include inorganic oxides, notably alumina or silica.

In addition to the foregoing materials, the catalyst produced can be composited with a porous matrix material such as aluminum phosphate, silica-alumina, silica-magnesia, silica-zirconia, silica-thoria, silica-beryllia, silica-titania as well as ternary compositions such as silica-alumina-thoria, silica-alumina-zirconia, silica-alumina-magnesia, and silica-magnesia-zirconia. The relative proportions of finely divided crystalline SM-7 material and inorganic oxide gel matrix vary widely, with the crystal content ranging from 1 to 90% by weight and more usually, particularly when the composite is prepared in the form of beads, in the range from about 2 to about 80 weight percent of the composite.

The crystalline material produced by the present process is readily convertible to catalytically active material for a variety of organic, e.g., hydrocarbon compound conversion processes.

SM-7 catalyst, when containing a hydrogenation promoter, can be used in a process for selectively producing middle distillate hydrocarbons by hydrocracking a hydrocarbonaceous feed wherein at least 90% of the feed has a boiling point above about 600° F. The hydrocracking conditions include reaction temperatures which generally exceed about 500° F. (260° C.) and are usually above about 600° F. (316° C.), preferably between about 600° F. (316° C.) and about 900° F. (482° C.). Hydrogen addition rates should be at least about 400, and are usually between about 1,000 and about 15,000 standard cubic feet per barrel. Reaction pressures generally exceed 200 psig (13.7 bar), and are usually within the range of about 500 to about 3000 psig (32.4 to 207 bar). Liquid hourly space velocities are less than about 15, preferably between about 0.2 and about 10.

The conditions should be chosen so that the overall conversion rate will correspond to the production of at least about 40%, and preferably at least about 500% of products boiling below about 725° F. (385° C.) per pass and preferably below about 725° F. and above about 300° F. Midbarrel selectivity should be such that at least about 40%, preferably at least about 50%, of the product is in the middle distillate range and preferably below about 725° F. and above about 300° F. The process can maintain conversion levels in excess of about 50% per pass at selectivities in excess of 60% to middle distillate products boiling between about 300° F. (149° C.) and about 725° F. (385° C.). The pour point of the middle distillate effluent obtained by the process will be below about 0° F., and preferably below −20° F.

The process can be operated as a single-stage hydroprocessing zone. It can also be the second stage of a two-stage hydrocracking scheme in which the first stage removes nitrogen and sulfur from the feedstock before contact with the middle distillate-producing catalyst. The catalyst can also be used in the first stage of a multi-step hydrocracking scheme. In operation as the first stage, the middle distillate-producing zone also denitrifies and desulfurizes the feedstock; in addition, it allows the second stage using the same catalyst or a conventional hydrocracking catalyst to operate more efficiently so that, overall, more middle distillates are produced than in other process configurations.

In the process of the invention, the hydrocarbon feedstock is heated with the catalyst under conversion conditions which are appropriate for hydrocracking. During the conversion, aromatics and naphthenes which are present in the feedstock undergo hydrocracking reactions such as dealkylation, ring opening, and cracking, followed by hydrogenation. Long-chain paraffins, which are also present in the feedstock, undergo mild cracking reactions to yield non-waxy products of higher molecular weight than compared to products obtained using the prior art dewaxing zeolitic catalysts such as ZSM-5, and at the same time, a measure of isomerization takes place so that not only is the pour point reduced by reason of the cracking reactions described above, but in addition the n-paraffins become isomerized to isoparaffins to form liquid-range materials which contribute to low viscosity, lower pour point products.

The feedstock for the process of the invention comprises a heavy hydrocarbon oil such as a gas oil, coker tower bottoms fractions, reduced crude, vacuum tower bottoms, deasphalted vacuum resids, FCC tower bottoms, cycle oils, Fischer Tropsch waxy feeds, waste polymers or biomass (including vegetable oils and other triglycerides). Oils derived from coal, shale, or tar sands may also be treated in this way. Oils of this kind generally boil above 600° F. (316° C.) although the process is also useful with oils which have initial boiling points as low as 436° F. (260° C.). Preferably at least 90% of the feed will boil above at least 600° F. (316° C.) and most preferably at least about 90% of the feed will boil between about 700° F. (371° C.) and about 1200° F. (649° C.). These heavy oils comprise high molecular weight long-chain paraffins and high molecular weight ring compounds with a large proportion of fused ring compounds. During the processing, both the fused ring aromatics and naphthenes and paraffinic compounds are cracked by the SM-7 containing catalyst to middle distillate range products. A substantial fraction of the paraffinic components of the initial feedstock also undergo conversion to isoparaffin.

The process is of particular utility with highly paraffinic feeds because, with feeds of this kind, the greatest improvement in pour point may be obtained. However, most feeds will contain a certain content of polycyclic compounds.

The process enables heavy feedstocks, such as gas oils, boiling above 600° F. to be more selectively converted to middle distillate range products having improved pour points in contrast to prior processes using large pore catalysts, such as zeolite Y.

The hydrocracking catalysts contain an effective amount of at least one hydrogenation catalyst (component) of the type commonly employed in hydrocracking catalysts. The hydrogenation component is generally selected from the group of hydrogenation catalysts consisting of one or more metals of Group VIB and Group VIII, including the salts, complexes, and solutions containing such. The hydrogenation catalyst is preferably selected from the group of metals, salts, and complexes thereof of the group consisting of at least one of platinum, palladium, rhodium, iridium, and mixtures thereof or the group consisting of at least one of nickel, molybdenum, cobalt, tungsten, titanium, chromium, and mixtures thereof. Reference to the catalytically active metal or metals is intended to encompass such metal or metals in the elemental state or in some form such as an oxide, sulfide, halide, carboxylate, and the like.

The hydrogenation catalyst is present in an effective amount to provide the hydrogenation function of the hydrocracking catalyst, and preferably in the range of from 0.05 to 25% by weight.

The SM-7 may be employed in conjunction with traditional hydrocracking catalysts, e.g., any aluminosilicate heretofore employed as a component in hydrocracking catalysts. Representative of the zeolitic aluminosilicates disclosed heretofore as employable as component parts of hydrocracking catalysts are Zeolite Y (including steam stabilized, e.g., ultra-stable Y), Zeolite X, Zeolite beta (U.S. Pat. No. 3,308, 069), Zeolite ZK-20 (U.S. Pat. No. 3,445,727), Zeolite ZSM-3 (U.S. Pat. No. 3,415,736), faujasite, LZ-10 (U.K. Patent No. 2,014,970, Jun. 9, 1982), ZSM-5-type zeolites, e.g., ZSM-5, ZSM-11, ZSM-12, ZSM-23, ZSM-35, ZSM-38, ZSM-48, crystalline silicates such as silicalite (U.S. Pat. No. 4,061,724), erionite, mordenite, offretite, chabazite, FU-1-type zeolite, NU-type zeolites, LZ-210-type zeolite, and mixtures thereof. Traditional cracking catalysts containing amounts of $Na_2O$ less than about 1% by weight are generally preferred. The relative amounts of the SM-7 component and traditional hydrocracking component, if any, will depend, at least in part, on the selected hydrocarbon feedstock and on the desired product distribution to be obtained therefrom, but in all instances an effective amount of SM-7 is employed. When a traditional hydrocracking catalyst (THC) component is employed, the relative weight ratio of the THC to the SM-7 is generally between about 1:10 and about 500:1, desirably between about 1:10 and about 200:1, preferably between about 1:2 and about 50:1, and most preferably is between about 1:1 and about 20:1.

The hydrocracking catalysts are typically employed with an inorganic oxide matrix component which may be any of the inorganic oxide matrix components which have been employed heretofore in the formulation of hydrocracking catalysts including: amorphous catalytic inorganic oxides, e.g., catalytically-active silica-aluminas, clays, silicas, aluminas, silica-aluminas, silica-zirconias, silica-magnesias, alumina-borias, alumina-titanias and the like, and mixtures thereof. The traditional hydrocracking catalyst and SM-7 may be mixed separately with the matrix component and then mixed or the THC component and SM-7 may be mixed and then formed with the matrix component.

SM-7 can be used in a process to dewax hydrocarbonaceous feeds (in addition to lube oils, these would include waxy middle distillates, including those derived from petroleum, Fischer-Tropsch, and vegetable oil feedstocks). The catalytic dewaxing conditions are dependent in large measure on the feed used and upon the desired pour point. Generally, the temperature will be between about 200° C. and about 475° C., preferably between about 250° C. and about 450° C. The pressure is typically between about 15 psig and about 3000 psig, preferably between about 200 psig and 3000 psig. The liquid hourly space velocity (LHSV) preferably will be from 0.1 to 20, preferably between about 0.2 and about 10.

Hydrogen is preferably present in the reaction zone during the catalytic dewaxing process. The hydrogen to feed ratio is typically between about 500 and about 30,000 SCF/bbl (standard cubic feet per barrel), preferably about 1000 to about 20,000 SCF/bbl. Generally, hydrogen will be separated from the product and recycled to the reaction zone.

It has been found that the present process provides selective conversion of waxy n-paraffins to non-waxy paraffins. During processing, the waxy paraffins undergo mild cracking reactions to yield non-waxy products of higher molecular weight than compared to products obtained using the prior art zeolitic catalyst. At the same time, a measure of isomerization takes place, so that not only is the pour point reduced by reason of the cracking reactions described above, but the n-paraffins additionally become isomerized to isoparaffins to form liquid range materials that contribute to a low viscosity, low pour point product.

The present process may be used to dewax a variety of feedstocks ranging from relatively light distillate fractions up to high boiling stocks such as whole crude petroleum, reduced crudes, vacuum tower residua, cycle oils, synthetic crudes (e.g., shale oils, tar sand oils, etc.), gas oils, vacuum gas oils, FT waxy streams, vegetable and other triglyceride oils, foot oils, and other heavy oils. The feedstock will normally be a $C_{10}$+ feedstock generally boiling above about 350° F. since lighter oils will usually be free of significant quantities of waxy components. However, the process is particularly useful with waxy distillate stocks such as middle distillate stocks including gas oils, kerosenes, and jet fuels, lubricating oil stocks, heating oils and other distillation fractions whose pour point and viscosity need to be maintained within certain specification limits. Lubricating oil stocks will generally boil above 230° C. (450° F.), more usually above 315° C. (600° F.). Hydroprocessed stocks which include stocks which have been hydrotreated to lower metals, nitrogen, oxygen, and sulfur levels and/or hydrocracked, are a convenient source of stocks of this kind and also of other distillate fractions since they normally contain significant amounts of waxy n-paraffins. The feedstock of the present process will normally be a $C_{10}$+ feedstock containing paraffins, olefins, naphthenes, aromatics, and heterocyclic compounds and with a substantial proportion of higher molecular weight n-paraffins and slightly branched paraffins which contribute to the waxy nature of the feedstock. During the processing, the n-paraffins and the slightly branched paraffins undergo some cracking or hydrocracking to form liquid range materials which contribute to a low viscosity product. The degree of cracking which occurs is, however, limited so that the gas yield is reduced, thereby preserving the economic value of the feedstock.

Typical feedstocks include light gas oils, heavy gas oils, and reduced crudes boiling above 350° F.

While the process herein can be practiced with utility when the feed contains organic nitrogen (nitrogen-containing impurities), it is preferred that the organic nitrogen content of the feed be less than 50 wppm, more preferably less than 10 wppm.

When used in some embodiments of the present process, the SM-7 is employed in admixture with at least one Group VIII metal as, for example, the noble metals such as platinum and palladium, and optionally other catalytically active metals such as molybdenum, vanadium, zinc, etc. The amount of metal ranges from about 0.01% to 10% and preferably 0.2 to 5% by weight of the molecular sieve.

The Group VIII metal utilized in the process of this invention can mean one or more of the metals in its elemental state or in some form such as the sulfide or oxide and mixtures thereof. As is customary in the art of catalysis, when referring to the active metal or metals, it is intended to encompass the existence of such metal in the elementary state or in some form such as the oxide or sulfide as mentioned above, and regardless of the state in which the metallic component actually exists, the concentrations are computed as if they existed in the elemental state.

The SM-7 silicoaluminophosphate molecular sieve can be composited with other materials resistant to the temperatures and other conditions employed in the dewaxing process. Such matrix materials include active and inactive materials and synthetic or naturally occurring zeolites as well as inorganic materials such as clays, silica, alumina, and metal oxides. Examples of zeolites include synthetic and natural faujasites (e.g., X and Y), erionites, mordenites, and those of the ZSM series, e.g., ZSM-5, etc. The combination of zeolites can also be composited in a porous inorganic matrix.

SM-7 can be used in a process to prepare lubricating oils. The process comprises (a) hydrocracking in a hydrocracking zone a hydrocarbonaceous feedstock to obtain an effluent comprising a hydrocracked oil; and (b) catalytically dewaxing in a catalytic dewaxing zone the hydrocracked oil of step (a) with a catalyst comprising a crystalline silicoaluminophosphate SM-7 and a Group VIII metal, preferably platinum or palladium.

Another embodiment of this process includes an additional step of stabilizing said dewaxed hydrocrackate by catalytic hydrofinishing.

The hydrocarbonaceous feeds from which lube oils are made usually contain aromatic compounds as well as normal and branched paraffins of very long chain lengths. These feeds usually boil in the gas oil range. Preferred feedstocks are vacuum gas oils with normal boiling ranges in the range of 350° C. to 600° C., and deasphalted residual oils having normal boiling ranges from about 480° C. to about 650° C. Reduced topped crude oils, shale oils, liquified coal, coke distillates, flask or thermally cracked oils, atmospheric residua, and other heavy oils can also be used. The first step in the processing scheme is hydrocracking. In commercial operations, hydrocracking can take place as a single-step process, or as a multi-step process using initial denitrification or desulfurization steps, all of which are well known.

The present process may be used to upgrade a variety of feedstocks ranging from relatively light distillate fractions such as kerosene and jet fuel up to high boiling stocks such as whole crude petroleum, reduced crudes, vacuum tower residua, cycle oils, synthetic crudes (e.g., shale oils, tars and oil, etc.), gas oils, vacuum gas oils, foots oils, and other heavy oils. Straight chain n-paraffins either alone or with only slightly branched chain paraffins having 16 or more carbon atoms are sometimes referred to herein as waxes. The feedstock will often be a $C_{10}+$ feedstock generally boiling above about 350° F. since lighter oils will usually be free of significant quantities of waxy components. However, the process is particularly useful with waxy distillate stocks such as middle distillate stocks including gas oils, kerosenes, and jet fuels, lubricating oil stocks, heating oils and other distillate fractions whose pour point and viscosity need to be maintained within certain specification limits. Lubricating oil stocks will generally boil above 230° C. (450° F.), more usually above 315° C. (600° F.). Hydroprocessed stocks are a convenient source of stocks of this kind and also of other distillate fractions since they normally contain significant amounts of waxy n-paraffins. The feedstock of the present process will normally be a $C_{10}+$ feedstock containing paraffins, olefins, naphthenes, aromatic and heterocyclic compounds and with a substantial proportion of higher molecular weight n-paraffins and slightly branched paraffins which contribute to the waxy nature of the feedstock. During the processing, the n-paraffins and the slightly branched paraffins undergo some cracking or hydrocracking to form liquid range materials which contribute to a low viscosity product. The degree of cracking which occurs is, however, limited so that the yield of products having boiling points below that of the feedstock is reduced, thereby preserving the economic value of the feedstock.

Typical feedstocks include light gas oils, heavy gas oils and reduced crudes boiling above 350° F. Such feedstocks generally have an initial pour point above about 0° C., more usually above about 20° C. The resultant products after the process is completed generally have pour points which fall below −0° C., more preferably below about −10° C.

As used herein, the term "waxy feed" includes petroleum waxes. The feedstock employed in the process of the invention can be a waxy feed which contains greater than about 50% wax, even greater than about 90% wax. Highly paraffinic feeds having high pour points, generally above about 0° C., more usually above about 10° C. are also suitable for use in the process of the invention. Such a feeds can contain greater than about 70% paraffinic carbon, even greater than about 90% paraffinic carbon.

Exemplary additional suitable feeds for use in the process of the invention include waxy distillate stocks such as gas oils, lubricating oil stocks, synthetic oils such as those by Fischer-Tropsch synthesis, high pour point polyalphaolefins, foots oils, synthetic waxes such as normal alphaolefin waxes, slack waxes, de-oiled waxes and microcrystalline waxes. Foots oil is prepared by separating oil from the wax. The isolated oil is referred to as foots oil.

The feedstock may be a $C_2 0+$ feedstock generally boiling above about 600° F. The process of the invention is useful with waxy distillate stocks such as gas oils, lubricating oil stocks, heating oils and other distillate fractions whose pour point and viscosity need to be maintained within certain specification limits. Lubricating oil stocks will generally boil above 230° C. (450° F.), more usually above 315° C. (600° F.). Hydroprocessed stocks are a convenient source of stocks of this kind and also of other distillate fractions since they normally contain significant amounts of waxy n-paraffins. The feedstock of the present process may be a $C_2 0+$ feedstock containing paraffins, olefins, naphthenes, aromatic and heterocyclic compounds and a substantial proportion of higher molecular weight n-paraffins and slightly branched paraffins which contribute to the waxy nature of the feedstock. During processing, the n-paraffins and the slightly branched paraffins undergo some cracking or hydrocracking to form liquid range materials which contribute to a low viscosity product. The degree of cracking which occurs is, however, limited so that the yield of low boiling products is reduced, thereby preserving the economic value of the feedstock.

Slack wax can be obtained from either a hydrocracked lube oil or a solvent refined lube oil. Hydrocracking is preferred because that process can also reduce the nitrogen content to low values. With slack wax derived from solvent refined oils, deoiling can be used to reduce the nitrogen content. Optionally, hydrotreating of the slack wax can be carried out to lower the nitrogen content thereof. Slack waxes possess a very high viscosity index, normally in the range of from 140 to 200, depending on the oil content and the starting material from which the wax has been prepared. Slack waxes are therefore eminently suitable for the preparation of lubricating oils having very high viscosity indices, i.e., from about 120 to about 180.

Feeds also suitable for use in the process of the invention are partially dewaxed oils wherein dewaxing to an intermediate pour point has been carried out by a process other than that claimed herein, for example, conventional catalytic dewaxing processes and solvent dewaxing processes. Exemplary suitable solvent dewaxing processes are set forth in U.S. Pat. No. 4,547,287.

Typically, hydrocracking process conditions include temperatures in the range of about 250° C. to about 500° C., pressures in the range of about 425 to 3000 psig, or more, a hydrogen recycle rate of 400 to 15,000 SCF/bbl, and a LHSV (v/v/hr) of 0.1 to 50.

Hydrogenation-dehydrogenation components of the hydrocracking catalyst usually comprise metals selected from Group VIII and Group VIB of the Periodic Table, and compounds including them. Preferred Group VIII components include cobalt, nickel, platinum, and palladium, particularly the oxides and sulfides of cobalt and nickel. Preferred Group VIB components are the oxides and sulfides of molybdenum and tungsten. Thus, examples of hydrocracking catalysts which are preferred for use in the hydrocracking step are the combinations nickel-tungsten-silica-alumina and nickel-molybdenum-silica-alumina A particularly preferred hydrocracking catalyst for use in the present process is nickel sulfide/tungsten sulfide on a silica-alumina base which contains discrete metal phosphate particles (described in U.S. Pat. No. 3,493,517, incorporated herein by reference).

The nitrogen content of the hydrocrackate is as low as is consistent with economical refinery operations, but is: preferably less than 50 ppm (w/w), and more preferably less than about 10 ppm (w/w), and most preferably less than about 1 ppm (w/w).

The hydrocracking step yields two significant benefits. First, by lowering the nitrogen content, it dramatically increases the efficiency and ease of the catalytic dewaxing step. Second, the viscosity index (VI) is greatly increased as the aromatic compounds present in the feed, especially the polycyclic aromatics, are opened and hydrogenated. In the hydrocracking step, increases of at least 10 VI units will occur in the lube oil fraction, i.e., that fraction boiling above 230° C. and more preferably above 315° C.

The hydrocrackate is preferably distilled by conventional means to remove those products boiling below 230° C., and more preferably below 315° C. to yield one or more lube oil boiling range streams. Depending upon the particular lube oil desired, for example, a light, medium, or heavy lube oil, the raw hydrocrackate may be distilled into light, medium, or heavy oil fractions. Among the lower boiling products removed are light nitrogen containing compounds such as NH$_3$. This yields a lube oil stream with a reduced nitrogen level, so that the SM-7 crystalline silicoaluminophosphate molecular sieve in the dewaxing catalyst achieves maximum activity in the dewaxing step. Lubricating oils of different boiling ranges can be prepared by the process of this invention. These would include light neutral, medium neutral, heavy natural, and bright stock, where the neutral oils are prepared from distillate fractions and bright stock from residual fractions.

The great efficiency of the present invention comes in part from the combination of hydrocracking to produce a very low nitrogen, high viscosity index stock which is then extremely efficiently dewaxed to achieve a very low pour point and improved viscosity and viscosity index. It can be appreciated that the higher the activity of the dewaxing catalyst, the lower the reactor temperature necessary to achieve a particular degree of dewaxing. A significant benefit is, therefore, the greater energy savings from using the enhanced efficiency catalyst and usually longer cycle life. Additionally, since the SM-7 crystalline silicoaluminophosphate dewaxing catalyst is shape-selective, it reacts preferentially with the waxy components of the feedstock responsible for high pour points, i.e., the normal paraffins as well as the slightly branched paraffins and alkyl-substituted cycloparaffins which comprise the so-called microcrystalline wax.

When used in the present process, the SM-7 silicoaluminophosphate is preferably employed in admixture with at least one of the noble metals platinum, palladium, and optionally other catalytically active metals such as molybdenum, nickel, vanadium, cobalt, tungsten, zinc, etc., and mixtures thereof. The amount of metal ranges from about 0.01% to 10% and preferably 0.2 to 5% by weight of the molecular sieve.

The metal utilized in the process of this invention can mean one or more of the metals in its elemental state or in some form such as the sulfide or oxide and mixtures thereof. As is customary in the art of catalysis, when referring to the active metal or metals it is intended to encompass the existence of such metal in the elementary state or in some form such as the oxide or sulfide as mentioned above, and regardless of the state in which the metallic component actually exists the concentrations are computed as if they existed in the elemental state.

The dewaxing step may be carried out in the same reactor as the hydrocracking step but is preferably carried out in a separate reactor. The catalytic dewaxing conditions are dependent in large measure on the feed used and upon the desired pour point. Generally, the temperature will be between about 200° C. and about 475° C., preferably between about 250° C. and about 450° C. The pressure is typically between about 15 psig and about 3000 psig, preferably between about 200 psig and 3000 psig. The liquid hourly, space velocity (LHSV) will generally be from 0.1 to 20, and preferably between about 0.2 and about 10.

Hydrogen is preferably present in the reaction zone during the catalytic dewaxing process. The hydrogen to feed ratio is typically between about 500 and about 30,000 SCF/bbl (standard cubic feet per barrel), preferably about 1,000 to about 20,000 SCF/bbl. Generally, hydrogen will be separated from the product and recycled to the reaction zone.

The SM-7 crystalline silicoaluminophosphate molecular sieve can be composited with other materials resistant to the temperatures and other conditions employed in the dewaxing process. Such matrix materials include active and inactive materials and synthetic or naturally occurring zeolites as well as inorganic materials such as clays, silica, alumina, and metal oxides. Examples of zeolites include synthetic and natural faujasites (e.g., X and Y), erionites, mordenites, and those of the ZSM series, e.g., ZSM-5, etc. The combination of zeolites can also be composited in a porous inorganic matrix.

It is often desirable to use mild hydrogenation (sometimes referred to as hydrofinishing) to produce more stable lubricating oils.

The hydrofinishing step can be performed either before or after the dewaxing step, and preferably after. Hydrofinishing is typically conducted at temperatures ranging from about 190° C. to about 340° C. at pressures from about 400 psig to about 3000 psig at space velocities (LHSV) between about 0.1 and 20 and hydrogen recycle rates of 400 to about 1500 SCF/bbl. The hydrogenation catalyst employed must be active enough not only to hydrogenate the olefins, diolefins, and color bodies within the lube oil fractions, but also to reduce the aromatic content. The hydrofinishing step is beneficial in preparing an acceptably stable lubricating oil since lubricant oils prepared from hydrocracked stocks tend to be unstable to air and light and tend to form sludges spontaneously and quickly.

Suitable hydrogenation catalysts include conventional metallic hydrogenation catalysts, particularly the Group VIII metals such as cobalt, nickel, palladium, and platinum. The metal is typically associated with carriers such as bauxite, alumina, silica gel, silica-alumina composites, and crystalline aluminosilicate zeolites. Palladium is a particularly preferred hydrogenation metal. If desired, non-noble Group VIII metals can be used with molybdates. Metal oxides or sulfides can be used. Suitable catalysts are detailed, for instance, in U.S. Pat. Nos. 3,852,207; 4,157,294; 3,904,153; and 4,673,487, all of which are incorporated herein by reference.

The improved process of this invention will now be illustrated by examples which are not to be construed as limiting the invention as described in this specification including the attached claims.

EXAMPLES

Comparative Example 1A

502 Grams of 86% H$_3$PO$_4$ were placed in a stainless steel beaker in an ice bath. To this were added 240 grams of ice with mixing. 308 grams of aluminum isopropoxide (Al[OC$_3$H$_7$]$_3$) plus 841 grams of ice were then added slowly with mixing using a Polytron. Then 98 grams of di-n-propylamine were added slowly with mixing, followed by another 571 grams of aluminum isopropoxide and 250 grams of ice. Next, an additional 98 grams of di-n-propylamine were slowly added with continued mixing. Then 64 grams of fumed silica (CABOSIL M-5) were added with mixing. The mixture had a pH of 9.2 and the following composition, expressed in molar ratios of oxides:

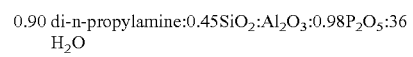

The mixture was placed in a stainless steel liner in a 1-gallon stirred autoclave and heated for two days at 190° C. and autogenous pressure. The product was filtered, washed with water, dried overnight in a vacuum oven at 120° C., and calcined in air for 8 hours at 593° C. Total weight (volatiles free) of calcined sieve recovered was 426 grams.

The calcined product was analyzed by x-ray diffraction. The product was found to be SAPO-11 type (AEL).

The molecular sieve was impregnated with 0.4 wt % Pt, dried, and calcined according to U.S. Pat. No. 5,939,349.

Example 1

The sieve synthesis of the above example was repeated, but this time 85 grams of hexadecylamine dissolved in 300 grams of 1-pentanol were added prior to the addition of silica. As in the above example, the product by x-ray diffraction analysis was found to be SAPO-11 type (AEL).

The molecular sieve was impregnated with 0.4 wt % Pt by non-aqueous impregnation according to U.S. Pat. No. 5,939,349, dried, and calcined as in the above example.

Comparative Example 2A

The catalyst of Comparative Example 1A was tested in a high-pressure pilot plant for isomerization of a hydrotreated Fischer-Tropsch wax (Table I).

TABLE I

| Inspections of Hydrotreated FT Wax | |
|---|---|
| Gravity, API | 41.2 |
| Sim. Dist., LV %, F. | |
| ST/5 | 445/567 |
| 10/30 | 621/710 |
| 50 | 787 |
| 70/90 | 868/970 |
| 95/EP | 1009/1095 |

Run conditions were 0.85 LHSV, 300 psig total pressure, and 5 MSCF/bbl once-through hydrogen. The liquid product went directly to a stripper which cut that product at 650° F. Reactor temperature was adjusted to give a pour point in the 650° F.+ stripper bottoms of −28° C.

Example 2

The catalyst of Example 1 was tested with the hydrotreated Fischer-Tropsch wax of Table I at the same conditions as in Comparative Example 2A. FIG. 1 shows this catalyst (labeled "SM-7") to be substantially more active than the catalyst of Comparative Example 1A (labeled "SM-3"), due to lower range of operating temperatures.

Figure 2:
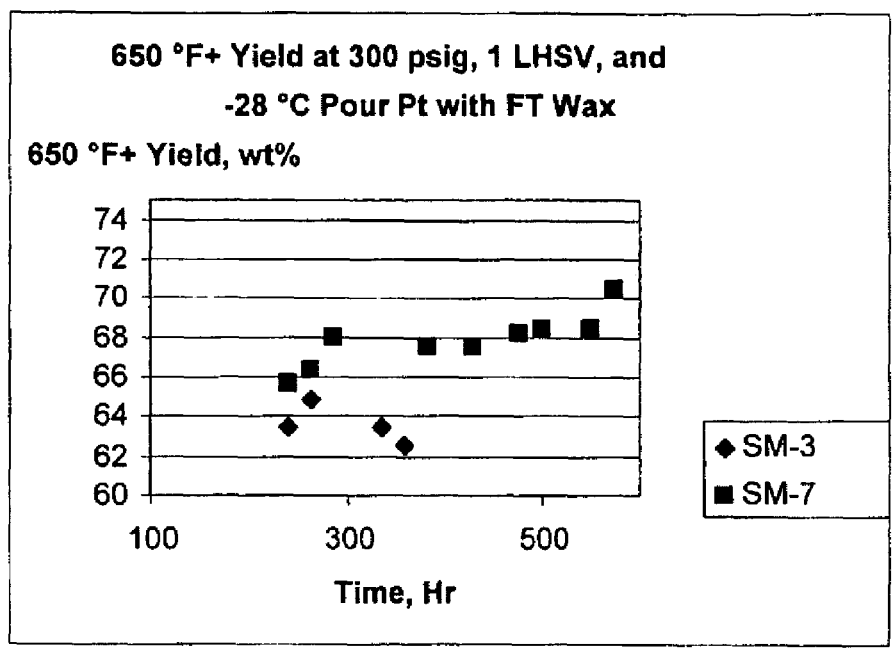
FIG. 2 shows the relative 650° F.+ bottoms yields of SM-7 and SM-3 in lowering the pour point of the Fischer-Tropsch wax used in FIG. 1.

The yield of 650° F.+ bottoms was also greater for the product prepared with the catalyst of Example 1 (see FIG. 2).

At the same time, the viscosity index of the 650° F.+ oil was the same as with the 650° F.+ oil made with the catalyst of Comparative Example 1A (see FIG. 3).

Example 3

A sample of the sieve of Example 1 was again impregnated with 0.4 wt % Pt, but this time using an aqueous solution of platinum tetraaminedinitrate. It was then dried and calcined as in Example 1.

Example 4

Figure 4:
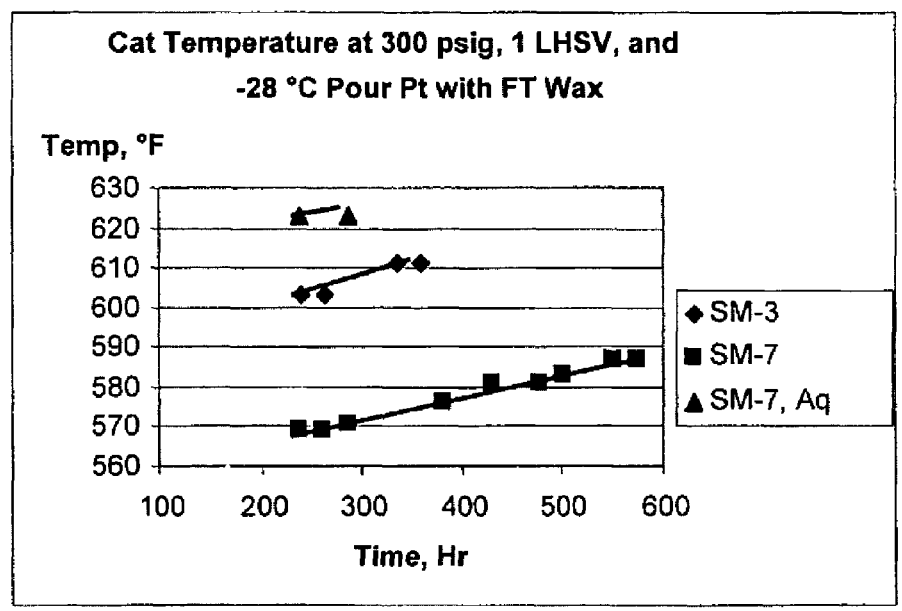
FIG. 4 shows relative activity of SM-7 catalyst impregnated with Pt in aqueous solution v. impregnated SM-7 in non-aqueous solution and impregnated SM-3 in non-aqueous solution for lowering the pour point of the Fischer-Tropsch wax feedstock used in FIG. 1.

The catalyst of Example 3 was tested with the hydrotreated Fischer-Tropsch wax of Table I at the same conditions as in Comparative Example 2A. FIG. 4 shows this catalyst of Example 3 (labeled "SM-7, Aq") to be substantially less active than the catalyst of Example 1 (labeled SM-7"), and less active than the catalyst of Comparative Example 1A (labeled "SM-3").

Figure 5:
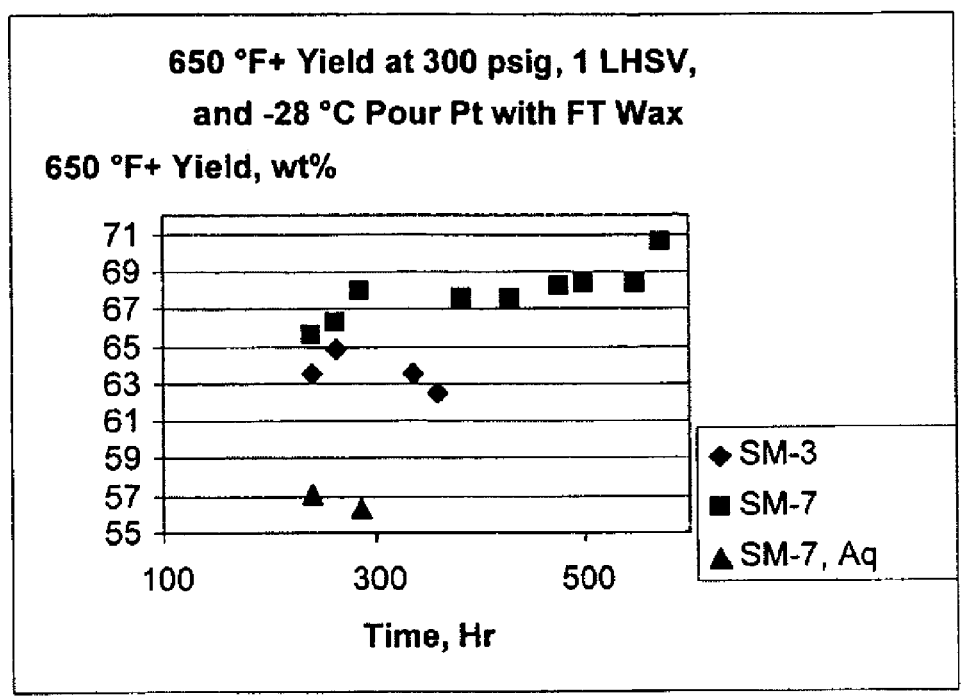
FIG. 5 shows the yield of 650° F.+ bottoms from the Fischer-Tropsch wax used in FIG. 1 was less for the product prepared with the new SM-7 catalyst impregnated with Pt in aqueous solution as compared to the new SM-7 catalyst impregnated with Pt in a non aqueous solution and the SM-3 catalyst impregnated with Pt in a non aqueous solution.

The yield of 650° F.+ bottoms was also much less for the product prepared with the catalyst of Example 3 (see FIG. 5).

Figure 6:
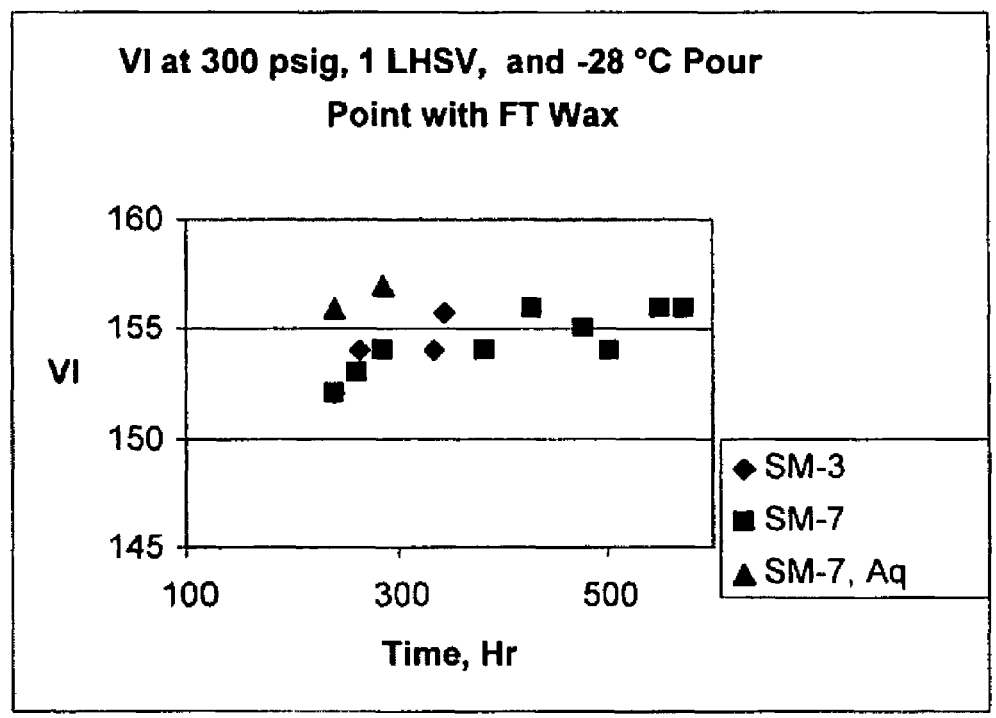
FIG. 6 shows the viscosity index of the 650° F.+ bottoms oils produced in FIG. 5.

The viscosity index of the 650° F.+ oil was about the same as with the 650° F.+ oil made with the catalyst of Comparative Example 1A (see FIG. 6).

Example 5

The catalyst of Example 1 was analyzed for bulk composition by an inductively-coupled plasma (ICP) technique, and for surface composition by X-ray photoelectron spectroscopy (XPS) surface analysis, as taught in U.S. Pat. No. 4,943,424, herein incorporated by reference. Bulk analysis showed 20.2 wt % P, 19.1 wt % Al and 4.53 wt % Si. P/Al atom ratio was 0.92, Si/P atom ratio was 0.25, and Si/Al atom ratio was 0.23. ESCA showed P/Al atom ratio of 0.77, Si/P atom ratio of 1.01, and Si/Al atom ratio of 0.78.

Discussion of Results of Comparative Studies of $^{29}$Si MAS NMR for SM-3 and SM-7 SAPO's SM-7 molecular sieve was compared to the composition of a well known prior art molecular sieve referred to as SM-3. Both catalysts showed similar X-ray diffraction patterns and had similar chemical compositions; however they differed in pore size distribution and Si distribution. SM-7 shows superior activity as compared to the well known SM-3 or prior art.

Standard pore size distribution analysis was performed using nitrogen (adsorption) on the SM-7 silicoaluminophosphate sieve, a SM-3 silicoaluminophosphate (Synthesis A), and a repeat SM-3 silicoaluminophosphate preparation (Synthesis B), where both Synthesis A and Synthesis B were similar to the synthesis in Comparative Example 1A. The results shown in Table 5 reveal that the SM-7 sieve had a significantly greater geometric mesopore surface area, and a significantly smaller mean mesopore diameter, compared to the Synthesis A SM-3 and Synthesis B SM-3 sieve.

TABLE 5

| Sample | Mean mesopore diameter (angstroms) | Geometric mesopore surface | Geometric mesopore diameter |
|---|---|---|---|
| SM-7 | 179.49 ang. | 71.54 m$^2$/g | 75.74 ang. |
| SM-3 Synthesis A Prep. | 233.23 ang. | 49.92 m$^2$/g | 131.05 ang. |
| SM-3 Synthesis B Prep. | 217.51 ang. | 49.89 m$^2$/g | 103.91 ang. |

Figure 9:
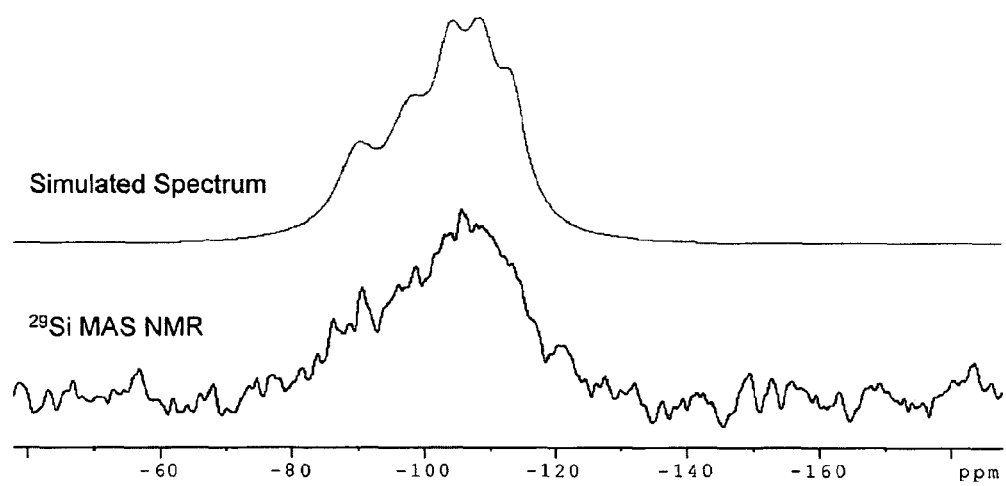
FIG. 9 shows the $^{29}$Si-MAS NMR spectrum and Si distribution of SM-7 catalyst.

U.S. Pat. No. 6,303,534 teaches using $^{29}$Si MAS NMR as a method in distinguishing the composition of SAPO molecular sieves when the chemical composition analysis and X-Ray Diffraction analysis are similar. This analysis method is routinely used to determine the distribution of silicon in SAPO molecular sieves. As shown in FIG. 9, aluminophosphates or AlPO$_4$ molecular sieves have a framework of AlO$_4$ and PO$_4$ tetrahedra linked by oxygen atoms (not shown). These materials are neutral and do not have any acidity. By replacing some of the PO$_4$ tetrahedra by SiO$_4$, acidity can be introduced to these materials, which are called silicoaluminophosphates or SAPOs. The overall acidity of SAPOs depends not only upon the Si content in the sample but also distribution of the Si in the sample. The Si may be surrounded by four Al atoms when the dispersion is very high or it may be surrounded by four Si atoms when the dispersion is poor forming large Si islands. Table 2 shows the characteristic chemical shift range of the five different local silicon environments. Si atoms may also be surrounded by one, two, or three Al atoms which induce acidity and are important for influencing the catalytic activity in SAPO materials.

The $^{29}$Si MAS NMR studies of the SAPO samples were carried out with proton decoupling and were recorded on a Bruker Avance 500 Spectrometer made by Bruker BioSpin Corporation located in Billerica, Ma. The spectrometer was equipped with a 4 mm MAS probe with resonance frequency of 99.35 MHz for $^{29}$Si MAS NMR. Typical experimental conditions were: 2000 to 8000 acquisitions; 4 to 5 microsecond pulse width; 60 to 120 seconds relaxation delay. All chemical shifts were reported in ppm and measured relative to tetramethyl silane (TMS). The deconvolutions of the NMR spectra were carried out using gNMR software version 5.0 marketed by IvorySoft. The spectra were deconvoluted into five silicon environments. Table 2 shows the characteristic chemical shift range of the different silicon environments in ppm from a TMS standard.

Figure 8:
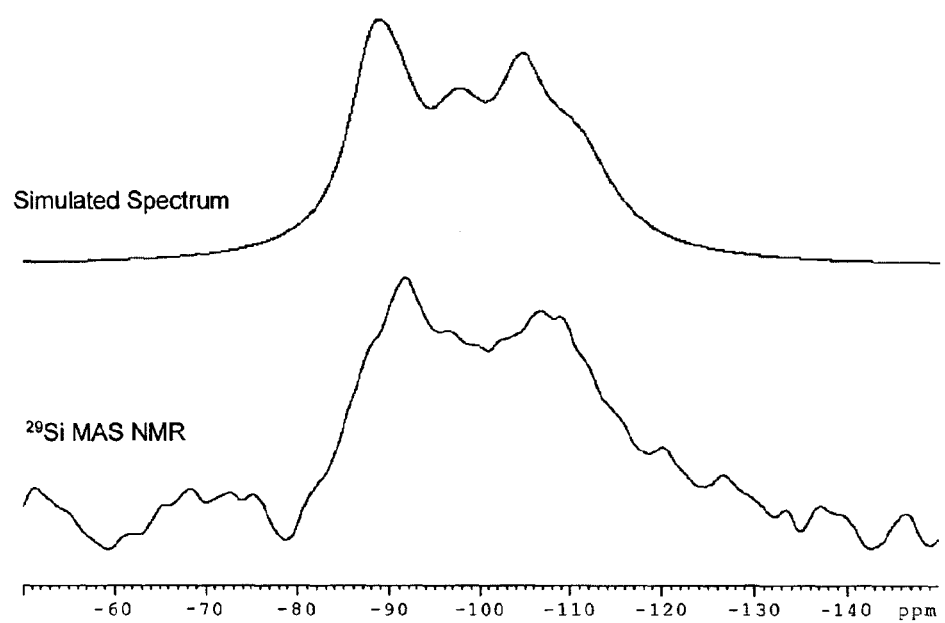
FIG. 8 shows the $^{29}$Si-MAS NMR spectrum and Si distribution of a repeat preparation of SM-3 catalyst.

Results from the $^{29}$Si MAS NMR analysis of SM-3 and SM-7 sieve preparations are shown in FIGS. 8 and 9. Each figure shows a $^{29}$Si MAS NMR (bottom trace) and a simulated spectrum (top trace).

In FIG. 8 the Synthesis B sample of the SM-3 sieve is shown with its $^{29}$Si MAS NMR spectra and simulated spectra. The Si is distributed in four of the Si environments, the Si(4Al), Si(3Al,1Si), the Si(2Al,2Si), and the Si(1Al,3Si). The deconvolution $^{29}$Si MAS NMR data associated with FIG. 8 (see Table 3) confirms this Si distribution and indicates very high dispersion of the Si without forming the Si islands.

the Si than in SM-3 due to the formation of the Si islands where Si atoms are surrounded by four Si atoms (Si(0Al, 4Si)). If Si dispersion in the catalyst is considered as the only criteria influencing the catalyst activity, one skilled in the art would expect poorer catalytic activity for molecular sieve sample SM-7. However, when the activity of this new sieve was measured it showed superior activity as compared to the SM-3 sieve preparations of the prior art.

SM-7 is found to have a greater density of medium-sized silica islands than SM-3. Such islands have a ratio of Si atoms coordinated as Si(3Al1Si) to that coordinated as Si(4Si) of 0.5 to 3.5, preferably from about 1 to about 3 and most preferably from 1 to 2. The greater density of medium-sized silica islands confers superior catalytic activity for wax isomerization, at least in part due to the greater proportion of Si(1Al3Si) sites associated with these islands, as seen in Table 3. As seen from that table, SM-7 contains 25.8% of the Si in Si(1Al3Si), as opposed to only 21.5% for SM-3. It is believed that these sites are associated with the strong acid functionality necessary for wax isomerization. Table 4 illustrates the improved dewaxing results obtained using Pt/SM-7 catalyst as com-

TABLE 3

Distribution of Si in SAPO 11 determined as pictured in FIG. 7 (first four rows) and that determined from the simulation of $^{29}$Si MAS NMR spectrum of SM-3 (FIG. 8) and SM-7 (FIG. 9).

| Distribution of Si | 29Si MAS NMR (%) | | | | | | Si Island | | Ratio |
| --- | --- | --- | --- | --- | --- | --- | --- | --- | --- |
| | 4Al0Si | 3Al1Si | 2Al2Si | 1Al3Si | 0Al4Si | % Si Dispersed | % 3Al1Si | % 0Al4Si | Si(3Al1Si)/Si(4Si) |
| High Dispersion | 100 | 0 | 0 | 0 | 0 | 100 | — | — | — |
| Small Islands | 0 | 60 | 8 | 20 | 12 | 0 | 60 | 12 | 5.0 |
| Medium Islands | 0 | 40 | 2 | 28 | 30 | 0 | 40 | 30 | 1.3 |
| Large Islands | 0 | 22 | 0 | 11 | 67 | 0 | 22 | 67 | 0.3 |
| SM-3 | 36.5 | 19.5 | 22.5 | 21.5 | 0 | 36.5 | 19.5 | 0.0 | — |
| SM-7 | 13.8 | 22.9 | 21.4 | 25.8 | 16.1 | 13.8 | 27 | 18.5 | 1.5 |

In FIG. 9, the SM-7 sieve is shown with its $^{29}$Si MAS NMR spectra and simulated spectra. The Si is distributed in all five of the Si environments, the Si(4Al), Si(3Al,1Si), the Si(2Al,2Si), the Si(1Al,3Si), and the Si(0Al,4Si). The deconvolution $^{29}$Si MAS NMR data (see Table 3) associated with FIG. 9 confirms this Si distribution and indicates lower dispersion of pared with Pt/SM-3 catalyst. Catalyst A of Table 4 is a Pt/SM-7 catalyst made using the sieve of Example 1, and Catalyst B is a Pt/SM-3 catalyst made using a sieve similar to that of Comparative Example 1A. Catalyst A shows a lower Brookfield viscosity at −40° C.

TABLE 4

Comparative Data-Dewaxed Fischer-Tropsch Base Oils

| PP Run/Hour Catalyst | | | | A | | B |
|---|---|---|---|---|---|---|
| Kinematic Viscosity @ 100° C., cSt | | 2.548 | | 4.146 | 7.261 | 4.194 |
| Kinematic Viscosity @ 40° C., cSt | | 8.788 | 10.19 | 17.57 | 39.23 | 17.53 |
| Viscosity Index | | 123 | | 143 | 151 | 149 |
| Cold Crank Viscosity @ −35° C., cP | | | | | | 1,622 |
| Cold Crank Viscosity @ −30° C., cP | | | | | | 904 |
| Pour Point, ° C. | | | | −20 | | −14 |
| Cloud Point, ° C. | | | | −12 | | −11 |
| RWI | | | | 0.18 | | 0.43 |
| WNF | | | | −0.36 | | −0.62 |
| API Gravity | | | | | | 41.8 |
| Molecular Weight (D2502) | | | | | | 412 |
| Molecular Weight (VPO) | | | | | | |
| Brookfield Viscosity @ −40° C., cP, 0.2% treat | | | | 3440 | | 8,810 |
| Brookfield Viscosity @ −40° C., cP, 0.4% treat | | | | 3,530 | | 5,300 |
| Noack, wt. % (calculated) | | | | | | 14.94 |
| TGA Noack, wt. % | | | | | | 15.96 |
| SIMDIST TBP (WT %), F. | TBP @0.5 | | | 652 | | 657 |
| | TBP @5 | | | 694 | | 699 |
| | TBP @10 | | | 715 | | 719 |
| | TBP @20 | | | 746 | | 746 |
| | TBP @30 | | | 770 | | 769 |
| | TBP @40 | | | 791 | | 791 |
| | TBP @50 | | | 811 | | 813 |
| | TBP @60 | | | 831 | | 835 |
| | TBP @70 | | | 851 | | 860 |
| | TBP @80 | | | 875 | | 885 |
| | TBP @90 | | | 907 | | 916 |
| | TBP @95 | | | 936 | | 940 |
| | TBP @99.5 | | | 1025 | | 998 |
| SIMDIST TBP (LV %), F. | TBP @0.5 | | | 651 | | 656 |
| | TBP @5 | | | 692 | | 697 |
| | TBP @10 | | | 713 | | 716 |
| | TBP @20 | | | 743 | | 744 |
| | TBP @30 | | | 767 | | 767 |
| | TBP @40 | | | 788 | | 788 |
| | TBP @50 | | | 809 | | 810 |
| | TBP @60 | | | 828 | | 832 |
| | TBP @70 | | | 849 | | 857 |
| | TBP @80 | | | 872 | | 882 |
| | TBP @90 | | | 904 | | 913 |
| | TBP @95 | | | 933 | | 938 |
| | TBP @99.5 | | | 1022 | | 996 |

Catalyst A is a Pt/SM-7 catalyst made using the sieve of Example 1, and Catalyst B is a Pt/SM-3 catalyst made using a sieve similar to that of Comparative Example 1A.

The catalyst also possesses a ratio of Si atoms coordinated as Si(3Al1Si) to that coordinated as Si(4Si) of at least 0.5, with the presence of Si atoms coordinated as Si(4Al) less than 40 mol. %. Preferably, the catalyst possesses a ratio of Si atoms coordinated as Si(3Al1Si) to that coordinated as Si(4Si) of at least 0.8, with the presence of Si atoms coordinated as Si(4Al) less than 30 mol. %. Most preferably, the catalyst possesses a ratio of Si atoms coordinated as Si(3Al1Si) to that coordinated as Si(4Si) of at least 1.0, with the presence of Si atoms coordinated as Si(4Al) less than 25 mol. %.

That which is claimed is:

1. A hydrocarbon conversion process, comprising contacting a hydrocarbonaceous feed at hydrocarbon converting conditions with a catalyst comprising a silicoaluminophosphate molecular sieve having the $^{29}$Si MAS NMR spectrum of FIG. 9.

2. The hydrocarbon conversion process of claim 1, wherein the molecular sieve comprises a mean mesopore diameter of less than 200 angstroms.

3. The hydrocarbon conversion process of claim 2, wherein the molecular sieve comprises a mean mesopore diameter of less than 195 angstroms.

4. The hydrocarbon conversion process of claim 3, wherein the molecular sieve comprises a mean mesopore diameter of less than 190 angstroms.

5. The hydrocarbon conversion process of claim 1, wherein the silicoaluminophosphate molecular sieve has a three dimensional microporous framework structure of [AlO$_2$] and [PO$_2$] units wherein the ratio of Si atoms coordinated as Si(3Al1Si) to that coordinated as Si(4Si), as determined by $^{29}$Si MAS NMR, is at least 0.5, the presence of Si atoms coordinated as Si(4Al) is less than 40 mol. %.

6. The hydrocarbon conversion process of claim 1, wherein the silicoaluminophosphate molecular sieve is selected from the group consisting of AEL, ATO and AFO.

7. The hydrocarbon conversion process of claim 1, wherein the silicoaluminophosphate molecular sieve is AEL.

8. The hydrocarbon conversion process of claim 1, wherein the silicoaluminophosphate molecular sieve has a P$_2$O$_5$ to Al$_2$O$_3$ bulk mole ratio of 0.85 or greater.

9. The hydrocarbon conversion process of claim 1, wherein the hydrocarbon converting conditions comprise a temperature between about 200° C. and about 475° C., a pressure between about 15 psig and about 3000 psig, a liquid hourly space velocity between about 0.2 and about 10, and a hydrogen to feed ratio between about 500 and about 30,000 SCF/bbl (standard cubic feet per barrel).

10. The hydrocarbon conversion process of claim 1, wherein the hydrocarbonaceous feed contains greater than 50% wax.

11. A hydrocarbon conversion process, comprising:
(a) contacting a hydrocarbonaceous feed with a hydrocracking catalyst and hydrogen under hydrocracking conditions to yield a hydrocrackate;
(b) contacting the hydrocrackate with a dewaxing catalyst and hydrogen under dewaxing conditions to yield a dewaxed hydrocrackate, the dewaxing catalyst comprising a silicoaluminophosphate molecular sieve having the $^{29}$Si MAS NMR spectrum of FIG. 9; and
(c) contacting the dewaxed hydrocrackate with a hydrogenation catalyst to yield a hydrofinished dewaxed hydrocrackate.

12. The hydrocarbon conversion process of claim 11, wherein the hydrocrackate has a nitrogen content of below 10 ppm (w/w).

13. The hydrocarbon conversion process of claim 12, wherein the hydrocrackate has a nitrogen content of below 1 ppm (w/w).

14. The hydrocarbon conversion process of claim 11, wherein the hydrocarbonaceous feed contains greater than 50% wax.

15. The hydrocarbon conversion process of claim 11, wherein the molecular sieve comprises a mean mesopore diameter of less than 200 angstroms.

16. The hydrocarbon conversion process of claim 11, wherein the silicoaluminophosphate molecular sieve has a three dimensional microporous framework structure of [AlO$_2$] and [PO$_2$] units wherein the ratio of Si atoms coordinated as Si(3Al1Si) to that coordinated as Si(4Si), as determined by $^{29}$Si MAS NMR, is at least 0.5, the presence of Si atoms coordinated as Si(4Al) is less than 40 mol. %.

17. The hydrocarbon conversion process of claim 11, wherein the silicoaluminophosphate molecular sieve is selected from the group consisting of AEL, ATO and AFO.

18. The hydrocarbon conversion process of claim 11, wherein the silicoaluminophosphate molecular sieve is AEL.

19. The hydrocarbon conversion process of claim 11, wherein the silicoaluminophosphate molecular sieve has a P$_2$O$_5$ to Al$_2$O$_3$ bulk mole ratio of 0.85 or greater.

* * * * *